(12) United States Patent
Wright et al.

(10) Patent No.: US 11,867,022 B2
(45) Date of Patent: Jan. 9, 2024

(54) ELECTRIC BALL VALVE MECHANISM

(71) Applicant: Halliburton Energy Services, Inc., Houston, TX (US)

(72) Inventors: Adam Davis Wright, Cypress, TX (US); Darryl Kenneth Mackie, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 379 days.

(21) Appl. No.: 17/294,814

(22) PCT Filed: Jan. 24, 2019

(86) PCT No.: PCT/US2019/014952
§ 371 (c)(1),
(2) Date: May 18, 2021

(87) PCT Pub. No.: WO2020/153962
PCT Pub. Date: Jul. 30, 2020

(65) Prior Publication Data
US 2022/0003070 A1    Jan. 6, 2022

(51) Int. Cl.
| | | |
|---|---|---|
| E21B 34/02 | (2006.01) | |
| F16K 5/06 | (2006.01) | |
| F16K 31/04 | (2006.01) | |
| E21B 47/13 | (2012.01) | |
| E21B 34/06 | (2006.01) | |

(52) U.S. Cl.
CPC ............ *E21B 34/02* (2013.01); *E21B 34/066* (2013.01); *E21B 47/13* (2020.05); *F16K 5/0647* (2013.01); *F16K 5/0652* (2013.01); *F16K 31/041* (2013.01)

(58) Field of Classification Search
CPC ........ E21B 34/02; E21B 34/025; E21B 34/04; E21B 2200/04; F16K 31/041; F16K 5/0647; F16K 5/0652
See application file for complete search history.

(56) References Cited

U.S. PATENT DOCUMENTS

| | | |
|---|---|---|
| 3,137,475 A | 6/1964 | Schoenecker et al. |
| 3,430,916 A | 3/1969 | Raymond, Jr. |

(Continued)

FOREIGN PATENT DOCUMENTS

| | | |
|---|---|---|
| GB | 2493180 | 1/2013 |
| WO | 2014011639 | 1/2014 |

OTHER PUBLICATIONS

Pawlus et al., "Hydraulic vs. Electric: A Review of Actuation Systems in Offshore Drilling Equipment", 2016 Norwegian Society of Automatic Control, 2016, pp. 1-17.

(Continued)

*Primary Examiner* — Shane Bomar
(74) *Attorney, Agent, or Firm* — Kilpatrick Townsend & Stockton LLP

(57) ABSTRACT

A well system includes a wellhead positionable at a surface of a wellbore. The well system also includes a ball valve for coupling to the wellhead. The ball valve is movable between an open position and a closed position. Further, the well system includes a hollow core electric motor positionable adjacent to the ball valve to move the ball valve between the open position and the closed position. Furthermore, the well system includes a power source that provides electric power to the hollow core electric motor.

18 Claims, 6 Drawing Sheets

(56) References Cited

U.S. PATENT DOCUMENTS

| | | | |
|---|---|---|---|
| 3,747,618 A * | 7/1973 | Boes | F16K 17/363 |
| | | | 137/81.1 |
| 4,375,239 A | 3/1983 | Barrington et al. | |
| 4,636,934 A | 1/1987 | Schwendemann et al. | |
| 5,588,617 A * | 12/1996 | Bliss | B64C 1/1453 |
| | | | 244/1 N |
| 6,125,930 A | 10/2000 | Moyes | |
| 6,213,201 B1 * | 4/2001 | Renkis | E21B 43/34 |
| | | | 166/66 |
| 6,343,654 B1 | 2/2002 | Brammer | |
| 6,776,240 B2 | 8/2004 | Kenison et al. | |
| 6,851,481 B2 | 2/2005 | Vinegar et al. | |
| 6,957,699 B2 | 10/2005 | Feluch et al. | |
| 9,624,753 B2 | 4/2017 | Stinessen et al. | |
| 2003/0030337 A1 * | 2/2003 | Aoki | F16K 31/05 |
| | | | 310/68 R |
| 2006/0124314 A1 * | 6/2006 | Haheim | E21B 33/076 |
| | | | 166/368 |
| 2008/0289878 A1 | 11/2008 | Livingstone | |
| 2011/0180267 A1 | 7/2011 | Wildman et al. | |
| 2012/0298902 A1 * | 11/2012 | Ma | F16K 31/043 |
| | | | 251/315.03 |
| 2013/0112320 A1 * | 5/2013 | Wright | B23K 7/00 |
| | | | 148/194 |
| 2013/0248203 A1 | 9/2013 | Scott et al. | |
| 2015/0300520 A1 * | 10/2015 | Lenz | E21B 34/066 |
| | | | 251/129.13 |
| 2017/0134101 A1 | 5/2017 | Ringgenberg | |
| 2017/0138154 A1 * | 5/2017 | Burdick | F16K 31/046 |
| 2018/0031142 A1 * | 2/2018 | Hillo | F16K 31/042 |
| 2018/0094747 A1 | 4/2018 | Dordoni et al. | |
| 2018/0347720 A1 * | 12/2018 | Mariano | E03B 7/075 |
| 2019/0085658 A1 * | 3/2019 | Reid | E21B 23/00 |
| 2019/0145220 A1 * | 5/2019 | Patel | E21B 34/10 |
| | | | 166/375 |
| 2020/0199968 A1 * | 6/2020 | Manett | F16K 5/08 |
| 2021/0148192 A1 * | 5/2021 | Fox | E21B 33/064 |
| 2021/0404560 A1 * | 12/2021 | Wright | F16K 27/06 |
| 2023/0037547 A1 * | 2/2023 | Newton | E21B 34/16 |
| 2023/0078075 A1 * | 3/2023 | Roth | E21B 7/046 |
| | | | 175/62 |

OTHER PUBLICATIONS

International Application No. PCT/US2019/014952, International Search Report and Written Opinion, dated Oct. 24, 2019, 12 pages.

* cited by examiner

ELECTRIC BALL VALVE MECHANISM

TECHNICAL FIELD

The present disclosure relates generally to downhole tools including ball valve mechanisms positioned along a well system. More specifically, though not exclusively, the present disclosure relates to an electric ball valve mechanism of the well system.

BACKGROUND

A well system (e.g., oil or gas wells for extracting fluids from a conventional or subsea formation) may include ball valve mechanisms positioned along a fluid flow path of the well system. For example, the ball valve mechanisms may be placed along a fluid flow path to isolate sections of the fluid flow path from each other. These ball valve mechanisms may be actuated from a surface of the well system using hydraulic actuation. Multiple hydraulic umbilicals may be used to actuate each ball valve mechanism in the well system. These hydraulic umbilicals take up a large amount of space, especially when stacking multiple ball valve mechanisms within the well system. Additionally, the hydraulic umbilicals may be strapped to tubing running into the well system, and strapping multiple hydraulic umbilicals to the tubing can slow the operation of running the tubing and risk damaging the hydraulic umbilicals. Moreover, maintaining hydraulic umbilicals may be prohibitively expensive under certain circumstances at a wellsite (e.g., on a subsea drilling platform).

DETAILED DESCRIPTION

Certain aspects and examples of the disclosure relate to an electric ball valve mechanism of a downhole tool positioned within a wellbore. A ball valve may be a valve using a spherical closure element (e.g., a ball) that is rotated a predefined amount to open and close the valve. A ball valve used for well control may be regulated with a ball valve that is electrically powered. For example, the ball valve may be connected to a power source located above the surface of the wellbore by a single electrical conductor or twisted-pair of electrical conductors. Or the ball valve may be connected to a battery pack or capacitor bank coupled with or proximate to the ball valve.

The electric ball valve may eliminate the hydraulic operational requirements by replacing the multiple hydraulic umbilical hoses required for each ball valve with a single electrical line or using wireless telemetry signaling (e.g., when the ball valve is powered using a battery source located proximate to the ball valve). The all-electric actuation method may eliminate the need for hydraulic umbilicals and complex control systems at the surface of the wellbore. Additionally, the all-electric actuation may deliver the fast actuation and shearing capabilities necessary for a subsea or downhole well-control barrier valve.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
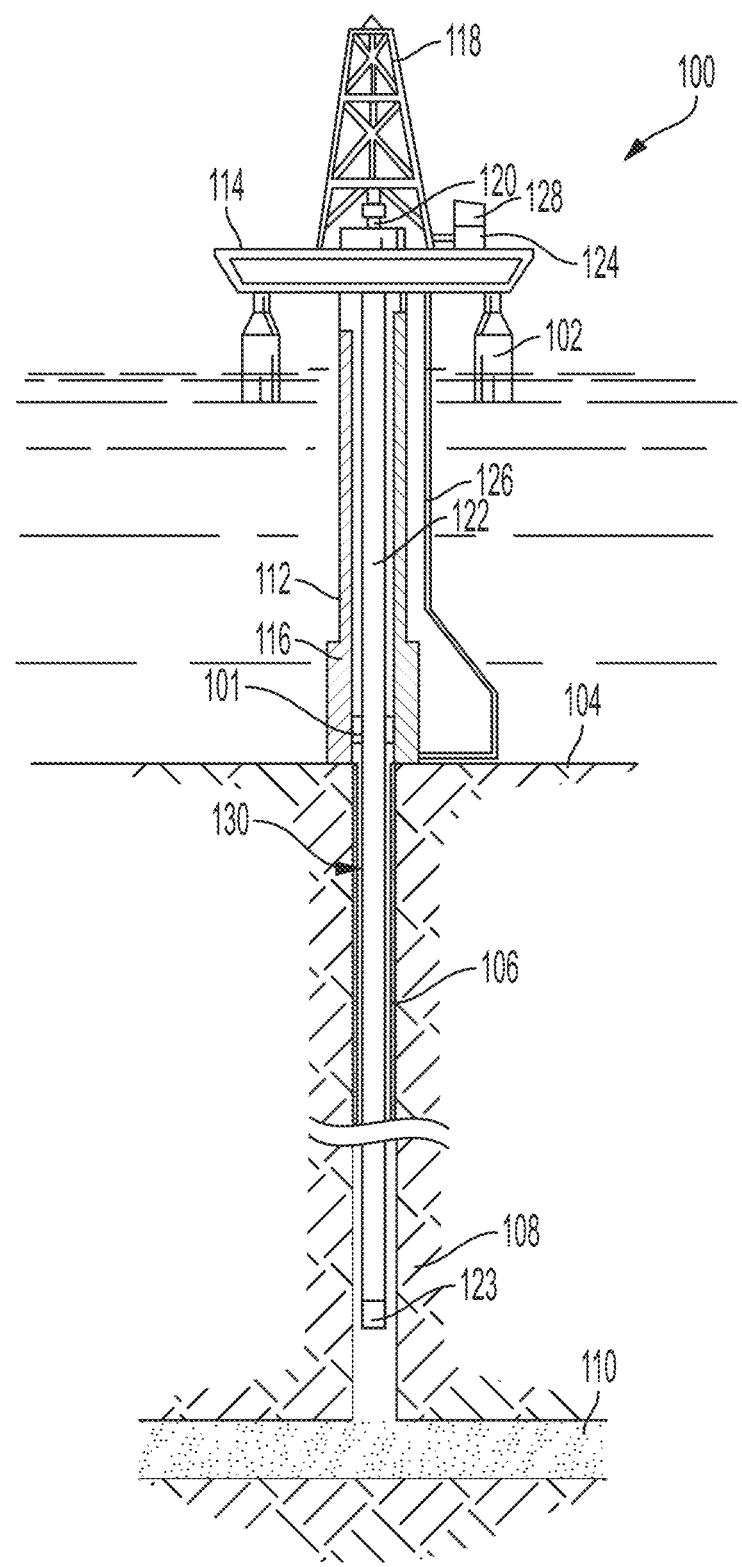
FIG. 1 is a cross-sectional view of an example of a wellbore environment incorporating an electric ball valve mechanism according to some aspects of the present disclosure.

FIG. 1 depicts a cross-sectional view of an example of a wellbore environment 100 incorporating an electric ball valve mechanism 101. A floating workstation 102 (e.g., an oil platform or an offshore platform) can be centered over a submerged oil or gas well located in a sea floor 104 having a wellbore 106. The wellbore 106 may extend from the sea floor 104 through a subterranean formation 108. The subterranean formation 108 can include a fluid-bearing formation 110. A subsea conduit 112 can extend from the deck 114 of the floating workstation 102 into a wellhead installation 116. The floating workstation 102 can have a derrick 118 and a hoisting apparatus 120 for raising and lowering tools to drill, test, and complete the oil or gas well. The floating workstation 102 can be an oil platform as depicted in FIG. 1 or an aquatic vessel capable of performing the same or similar drilling and testing operations. In some examples, the processes described herein can be applied to a land-based environment for wellbore exploration, planning, and drilling.

A tool conveyance string 122 can be lowered into the wellbore 106 of the oil or gas well as part of a completion operation of the oil or gas well. The tool conveyance string 122 can include one or more downhole tools 123 that are usable for testing and measurement operations. In an example, the tool conveyance string 122 may include a wireline or coiled tubing and the downhole tool 123 may include a wireline logging and formation tester. Other tools may also be lowered into the wellbore 106, such as wellbore stimulation equipment, production tubing and equipment, sand control tools, packers, safety valves and any other tools usable during completion and production within the wellbore 106.

An electrical power source 124 (e.g., an electrical power generator) located on the deck 114 can provide power along an electrical conductor 126 to provide electrical power the electric ball valve mechanism 101. The electrical conductor 126 may include a single electrical conductor, or the electrical conductor 126 may include a twisted-pair of electrical conductors. In an example, one of the electrical conductors of the twisted-pair of electrical conductors may function as a control line that provides control signals from a controller 128 to control operation of the electric ball valve mechanism 101. In additional examples, other control lines (not shown) may also be provided within or alongside the electrical conductor 126 to provide the control signals from the controller 128 to the electric ball valve mechanism 101. In other examples, a telemetry communication system may enable transmission of the control signals wirelessly from the controller 128 to the electric ball valve mechanism 101. For example, the telemetry communication system may include an electromagnetic telemetry system, an acoustic telemetry system, or any other wireless telemetry systems.

The electric ball valve mechanism 101 is controllable to a fully open position (e.g., as illustrated in FIG. 1), to a fully closed position, or to any number of positions between fully opened and fully closed. In the fully open position or in a partially open position, the electric ball valve mechanism 101 provides a path for the tool conveyance string 122 or other downhole oil and gas production or completion tools and conveyance mechanisms to travel downhole. In the fully closed position, the electric ball valve mechanism 101 closes the path for the tool conveyance string 122 or other downhole tools and conveyance mechanisms to travel downhole. Additionally, the fully closed position of the electric ball valve mechanism 101 isolates a portion 130 of the wellbore 106 that is downhole from the electric ball valve mechanism 101 from the subsea conduit 112 located uphole from the electric ball valve mechanism 101. That is, in the fully closed position, the electric ball valve mechanism 101 provides a seal along a fluid path of the wellbore 106.

In one or more examples, the electric ball valve mechanism 101 is able to cut coil tubing (not shown), wireline (not shown), slickline (not shown), or any other downhole conveyance elements when the electric ball valve mechanism 101 transitions to the fully closed position while the downhole conveyance mechanisms are located within the path of the electric ball valve mechanism 101. In this manner, the electric ball valve mechanism 101 is able to isolate the portion 130 from the subsea conduit 112 even when tools are operating within the portion 130 located downhole from the electric ball valve mechanism 101. Further, primary cells, a rechargeable battery pack, or a capacitor bank (not shown) may be located at or near the electric ball valve mechanism 101. The primary cells, the rechargeable battery pack, or the capacitor bank (i.e., an auxiliary power source) may provide sufficient auxiliary power to the electric ball valve mechanism 101 to automatically close the electric ball valve mechanism 101 in the event of a power loss at the electrical conductor 126 or in the event of losing control signals from the wireless telemetry system. Further, in an example, the primary cells, the rechargeable battery pack, the capacitor bank, or any other electrical power storage device may replace the electrical conductor 126 to provide the primary power source to the electric ball valve mechanism 101.

As illustrated, the electric ball valve mechanism 101 may be positioned within the wellhead installation 116. For example, the electric ball valve mechanism 101 may be coupled to a blowout preventer (BOP) component (not shown) of the wellhead installation 116. In additional examples, one or more of the electric ball valve mechanism 101 may be positioned anywhere along the subsea conduit 112 and the wellbore 106. For example, the ball valve mechanism 101 may be positioned as a lubricator valve in an upper completion of an oil well, the ball valve mechanism 101 may be positioned as a tester valve as a component of a drill stem test string, the ball valve mechanism 101 may be positioned as a subsea test tree ball valve within a blowout preventer, the ball valve mechanism 101 may be positioned as a surface control valve within a production facility, or the ball valve mechanism 101 may be positioned within or as a part of any other device. The isolation and auto-close capabilities of the electric ball valve mechanism 101 in a compact form factor enable the electric ball valve mechanism 101 to operate as a primary well-control barrier. Additionally, the electric power actuation of the electric ball valve mechanism 101 provides fast actuation and shearing capabilities (e.g., for wireline, slickline, and coil tubing) usable at the wellhead installation 116 in a subsea environment or as a downhole barrier valve in a land-based or subsea environment.

Figure 2:
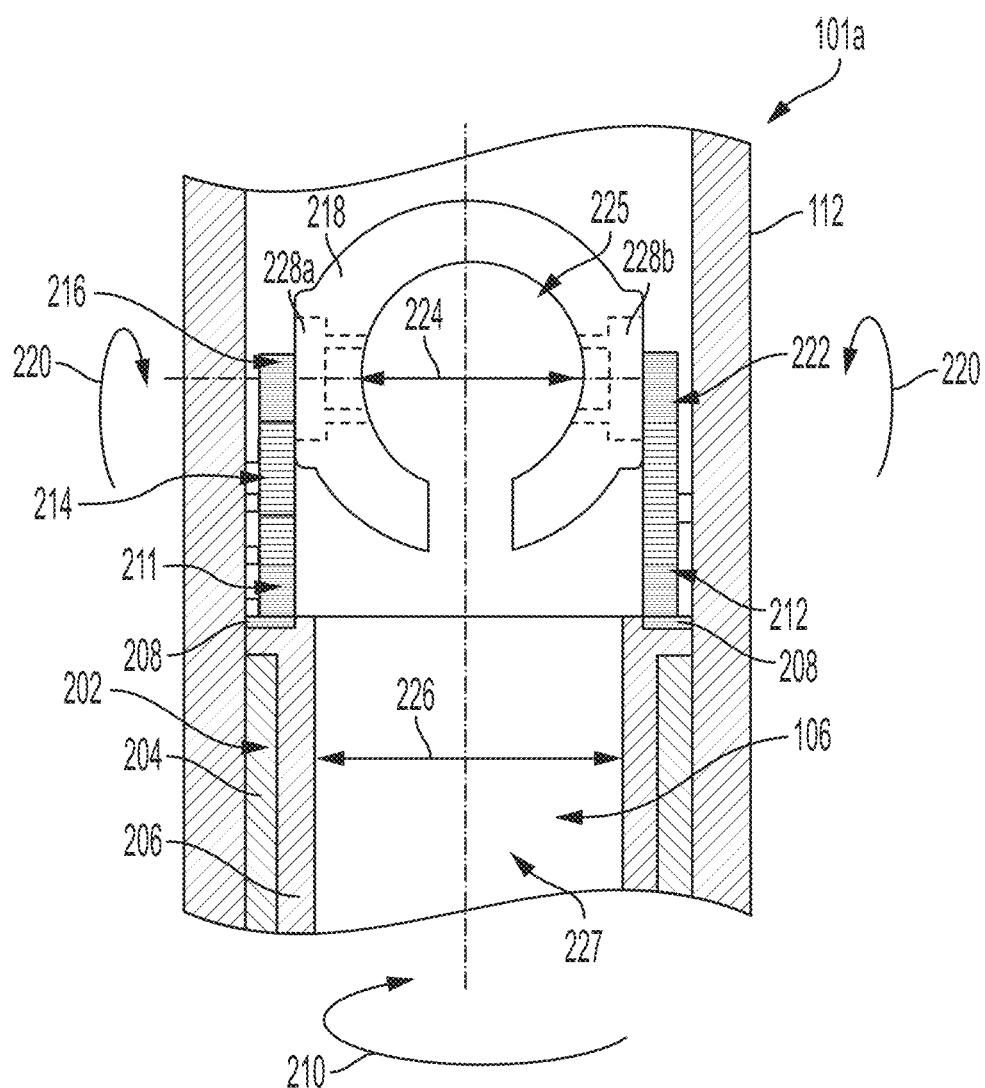
FIG. 2 is a cross-sectional view of the electric ball valve mechanism of FIG. 1 with a hollow core electric motor according to some aspects of the present disclosure.

FIG. 2 is a cross-sectional view of an electric ball valve mechanism 101a with a hollow core electric motor 202. The hollow core electric motor 202 may include a stationary component 204 (i.e., a stator) and a moving component 206 (i.e., a rotor). In one or more examples, an application of electrical power to the hollow core electric motor 202 may result in movement of the moving component 206. As the moving component 206 moves, a gear tooth surface 208 of the moving component 206 rotates in a clockwise direction 210. In an example, the gear tooth surface 208 may also rotate in a counter-clockwise direction.

The gear tooth surface 208 may interact with gears 211 and 212 to provide a 90 degree gear transition. As illustrated, the gear 211 may interact with an intermediate gear 214, and the intermediate gear 214 may interact with a drive gear 216 that is coupled to a ball valve 218. Because of the intermediate gear 214, the force applied by the drive gear 216 to the ball valve 218 may be in a direction 220. For a drive gear 222, which is positioned on an opposite side of the ball valve 218 from the drive gear 216, to also supply a force in the direction 220, the gear 212 interacts directly with the drive gear 222 (i.e., without an intermediate gear).

In this manner, the drive gears 216 and 222 supply a force in the same direction 220 on the ball valve 218 when the moving component 206 moves in the clockwise direction 210. Similarly, when the moving component 206 is driven in a counter-clockwise direction (i.e., opposite the clockwise direction 210), the drive gears 216 and 222 supply a force on the ball valve 218 in a direction opposite the direction 220. The force supplied by the drive gears 216 and 222 on the ball valve enable opening and closing operations on the ball valve 218.

As illustrated, the ball valve 218 is in a fully closed position. That is, the ball valve 218 is in a position that creates a seal between portions of the wellbore 106 downhole from the ball valve 218 and any portions of the wellbore 106 or subsea conduit 112 uphole from the ball valve 218. By rotating the ball valve 218 in the direction 220, the ball valve 218 may be partially opened or fully opened to enable a flow of fluid through the ball valve 218 or to enable a deployment of downhole tools within the wellbore 106. Further, because the gears 211 and 212 are actuated with the hollow core electric motor 202, any downhole tools with a diameter that is smaller than a smaller diameter of (i) a diameter 224 of a through-bore 225 of the ball valve 218 and (ii) a diameter 226 of a hollow core 227 of the hollow core electric motor 202 are capable of deployment downhole within the wellbore 106.

To improve torque available to act on the ball valve 218, each of the trunnions 228a and 228b of the ball valve 218 may include a planetary gear set to multiply the torque provided by the drive gears 216 and 222 to the ball valve 218. Moreover, the ball valve 218 may include a control system with a downhole motor drive circuit. The downhole motor drive circuit may provide a position indication to the controller 128 such that the controller 128 is able to determine a precise position of a rotation of the ball valve 218.

In an example, the rotation of the ball valve 218 may be tracked using a Hall effect sensor or any other position indicator.

Figure 3:
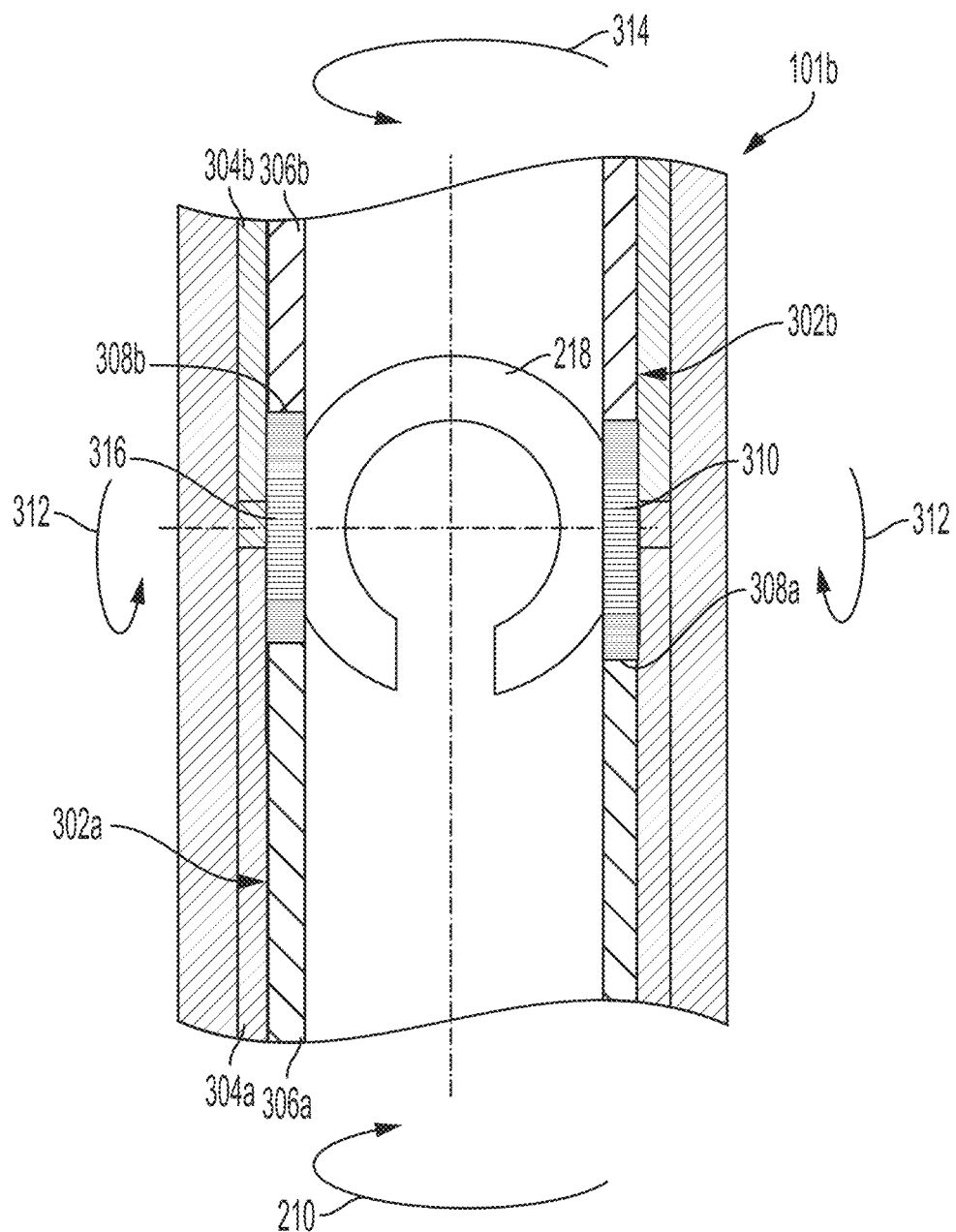
FIG. 3 is a cross-sectional view of the electric ball valve mechanism of FIG. 1 with two hollow core electric motors according to some aspects of the present disclosure.

FIG. 3 is a cross-sectional view of an electric ball valve mechanism 101b with two hollow core electric motors 302a and 302b. The hollow core electric motors 302a and 302b may each include a stationary component 304a and 304b, respectively, and a moving component 306a and 306b, respectively. In one or more examples, an application of electrical power to the hollow core electric motor 302a may result in movement of the moving component 306a in the clockwise direction 210. As the moving component 306a moves, a gear tooth surface 308a of the moving component 306a rotates in the clockwise direction 210. Additionally, the gear tooth surface 308a may interact with a drive gear 310 to provide a 90 degree gear transition. The drive gear 310 may provide a force on the ball valve 218 in a direction 312 based on the hollow core electric motor 302a moving in the clockwise direction 210.

Similarly, an application of electrical power to the hollow core electric motor 302b may result in movement of the moving component 306b in a counter-clockwise direction 314. As the moving component 306b moves, a gear tooth surface 308b of the moving component 306b rotates in the counter-clockwise direction 314. Additionally, the gear tooth surface 308b may interact with drive gear 316 to provide a 90 degree gear transition. The drive gear 316 may provide a force on the ball valve 218 in the direction 312 based on the hollow core electric motor 302b moving in the counter-clockwise direction 314. In this manner, both of the drive gears 310 and 316 provide the force on the ball valve 218 in the direction 312 when the hollow core electric motor 302a moves in the clockwise direction 210 and the hollow core electric motor 302b moves in the counter-clockwise direction 314. Likewise, the force provided on the ball valve 218 by the drive gears 310 and 316 is reversed when the hollow core electric motor 302a moves in the counter-clockwise direction 314 and the hollow core electric motor 302b moves in the clockwise direction 210.

Figure 4:
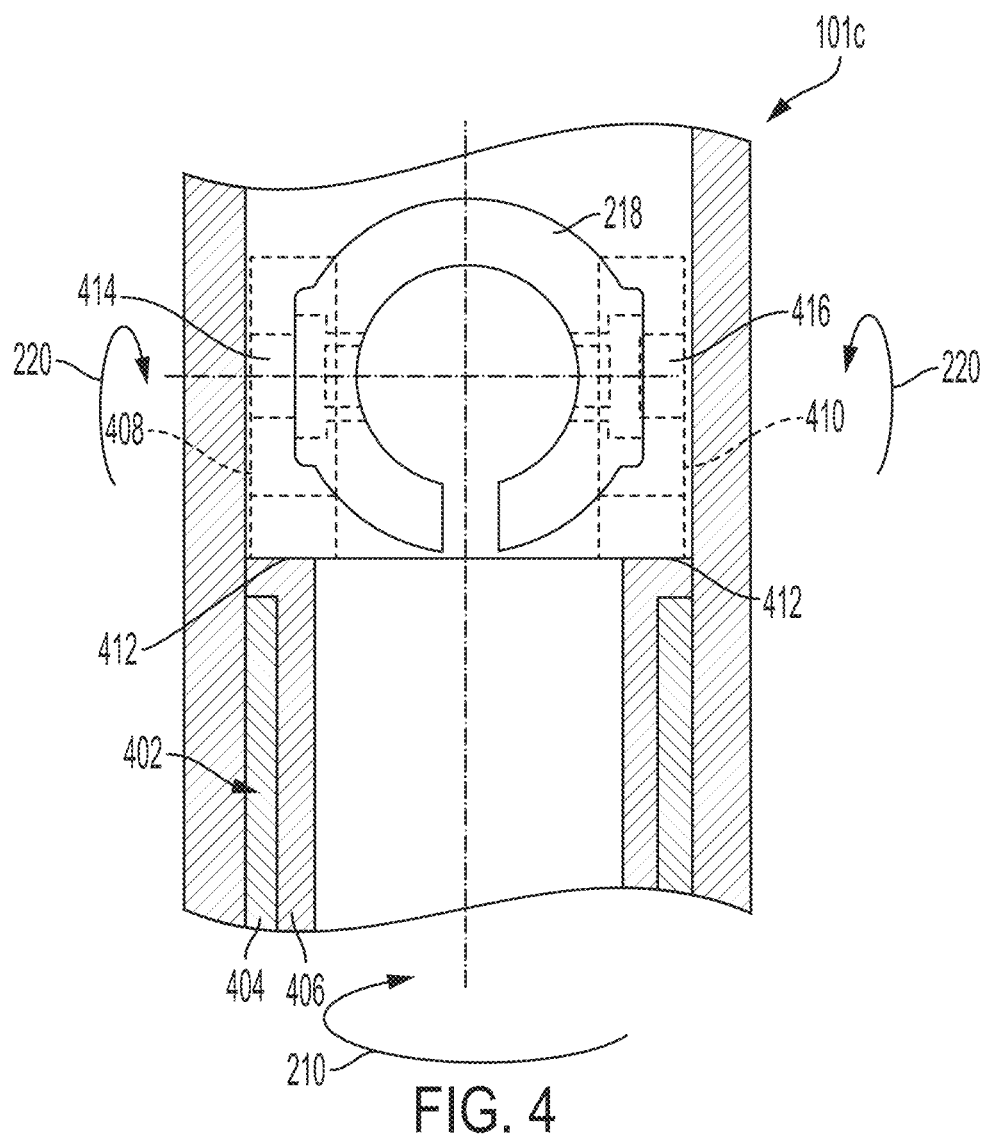
FIG. 4 is a cross-sectional view of the electric ball valve mechanism of FIG. 1 with a hollow core electric motor driving a hydraulic pump according to some aspects of the present disclosure.

FIG. 4 is a cross-sectional view of an electric ball valve mechanism 101c with a hollow core electric motor 402 driving hydraulic pumps 408 and 410 according to some aspects of the present disclosure. The hollow core electric motor 402 may include a stationary component 404 and a moving component 406. In one or more examples, an application of electrical power to the hollow core electric motor 402 may result in movement of the moving component 406. As the moving component 406 moves, a surface 412 of the moving component 406 rotates in the clockwise direction 210. In other examples, the surface 412 may rotate in a counter-clockwise direction.

The surface 412 may interact with hydraulic pumps 408 and 410 to energize the hydraulic pumps 408 and 410. As illustrated, the hydraulic pumps 408 and 410 may drive hydraulic rotary actuators 414 and 416 that are coupled to opposite sides of the ball valve 218. In an example, the force applied by the hydraulic rotary actuators 414 and 416 to the ball valve 218 may be in the same direction 220. Additionally, when the moving component 406 rotates in a counter-clockwise direction, a flow of hydraulic fluid in the hydraulic pumps 408 and 410 may reverse resulting in the hydraulic rotary actuators 414 and 416 applying a force on the ball valve 218 in a direction opposite the direction 220. While the two hydraulic pumps 408 and 410 and the two hydraulic rotary actuators 414 and 416 are illustrated in FIG. 4, a single hydraulic pump 408 or 410 and a single hydraulic rotary actuator 414 or 416 may also be used.

Figure 5:
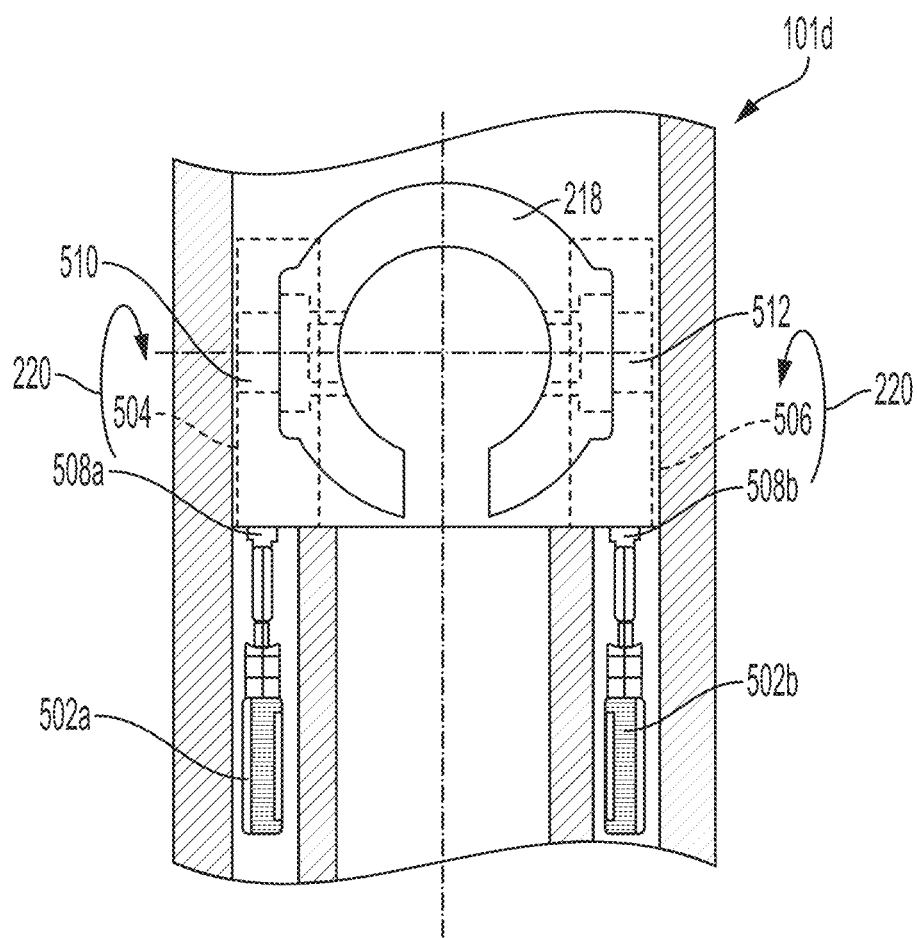
FIG. 5 is a cross-sectional view of the electric ball valve mechanism of FIG. 1 with multiple electric motors driving multiple hydraulic pumps according to some aspects of the present disclosure.

FIG. 5 is a cross-sectional view of the electric ball valve mechanism 101d with multiple electric motors 502a and 502b driving multiple hydraulic pumps 504 and 506. The electric motors 502a and 502b may include any type of electric motor capable of driving the hydraulic pumps 504 and 506. In one or more examples, an application of electrical power to the electric motors 502a and 502b may result in rotation of drive shafts 508a and 508b, respectively, of the electric motors 502a and 502b.

As the drive shafts 508a and 508b rotate, the drive shafts 508a and 508b may interact with hydraulic pumps 504 and 506, respectively, to energize the hydraulic pumps 504 and 506. As illustrated, the hydraulic pumps 504 and 506 may drive hydraulic rotary actuators 510 and 512 that are coupled to opposite sides of the ball valve 218. In an example, the force applied by the hydraulic rotary actuators 510 and 512 to the ball valve 218 may be in the same direction 220. Additionally, when the drive shafts 508a and 508b reverse rotation directions, a flow of hydraulic fluid in the hydraulic pumps 504 and 506 may reverse resulting in the hydraulic rotary actuators 510 and 512 applying a force on the ball valve 218 in a direction opposite the direction 220. While the two electric motors 502a and 502b, the two hydraulic pumps 504 and 506, and the two hydraulic rotary actuators 510 and 512 are illustrated in FIG. 5, a single electric motor 502a or 502b, a single hydraulic pump 504 or 506, and a single hydraulic rotary actuator 510 or 512 may also be used.

Figure 6:
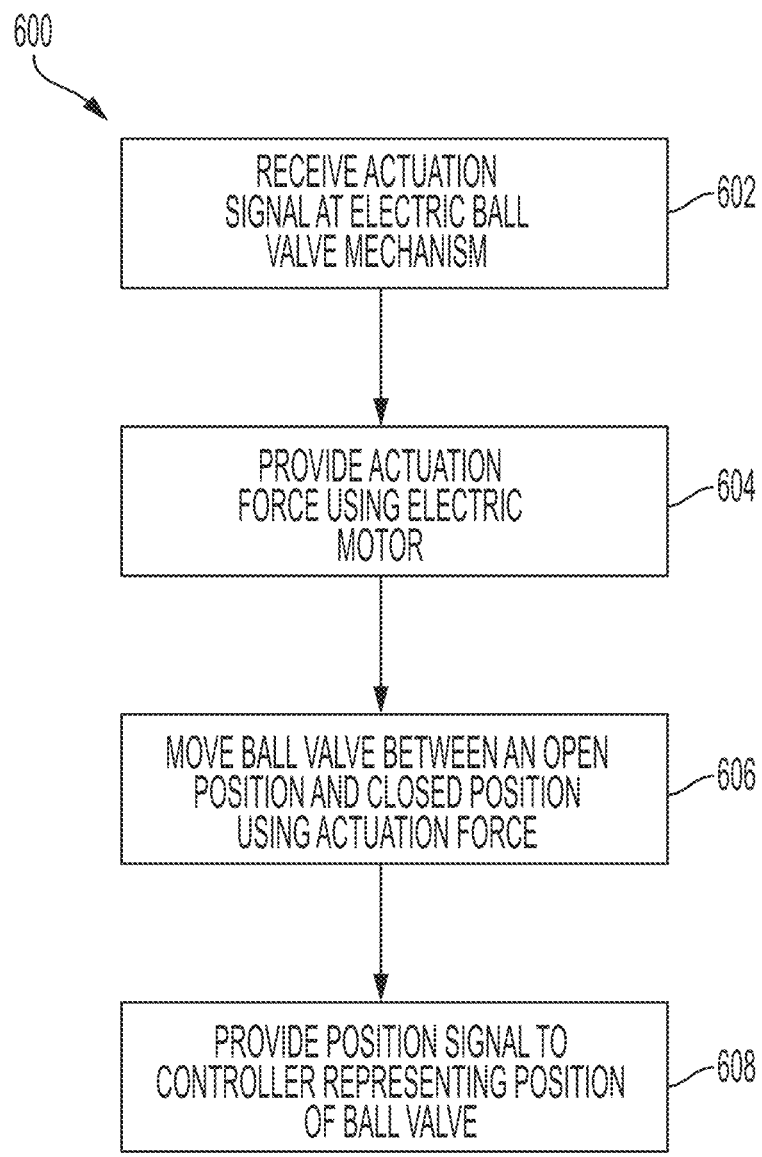
FIG. 6 is a flowchart of a process for operating the electric ball valve mechanism of FIGS. 1-5 according to some aspects of the present disclosure.

FIG. 6 is a flowchart of a process 600 for operating the electric ball valve mechanism 101. At block 602, the process 600 involves receiving an actuation signal at the electric ball valve mechanism 101. In an example, the actuation signal may be a control signal from the controller 128. The actuation signal may be received at the electric ball valve mechanism 101 using a control line from the controller 128 to the electric ball valve mechanism 101. In another example, the actuation signal may be received at the electric ball valve mechanism 101 using an acoustic or electromagnetic telemetry system.

At block 604, the process 600 involves providing an actuation force to the ball valve 218 of the electric ball valve mechanism 101 using an electric motor. The electric motor may be the hollow core electric motor 202, 302, 402 or the electric motor may be any other type of electric motor 502 positionable within the wellbore 106 without impeding tools or a flow of fluid within the wellbore 106. Further, the electric motor may be a single electric motor, or the electric motor may be multiple electric motors.

At block 606, the process 600 involves moving the ball valve 218 of the electric ball valve mechanism 101 between an open position and a closed position using the actuation force of the electric motor. In an example, the actuation force of the electric motor may operate on a set of gears or on a hydraulic pump to move the ball valve 218 between the open position and the closed position. Further, in one or more examples, the actuation force provided by the electric motor is sufficient to cut a slickline, a wireline, or a coil tubing extending through the through-bore 225 of the ball valve 218 as the ball valve 218 moves from the open position to the closed position.

At block 608, the process 600 involves providing a position signal to the controller 128 that represents a position of the ball valve 218. For example, a Hall effect sensor or other position sensor may detect if the ball valve 218 is in a closed position, an open position, or a position between the open position and the closed position. The electric ball valve mechanism 101 may provide an indication of the position detected by the sensor to the controller 128 such that the controller is able to accurately track a current position of the ball valve 218.

In some aspects, systems, devices, and methods for operating an electric ball valve mechanism are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a well system comprising: a wellhead positionable at a surface of a wellbore; a ball valve for coupling to the wellhead, the ball valve being movable between an open position and a closed position; a hollow core electric motor positionable adjacent to the ball valve to move the ball valve between the open position and the closed position; and a power source operable to provide electric power to the hollow core electric motor.

Example 2 is the system of example 1, wherein the hollow core electric motor comprises an upper hollow core electric motor positionable adjacent to an uphole portion of the ball valve and a lower hollow core electric motor positionable adjacent a downhole portion of the ball valve.

Example 3 is the system of examples 1-2, wherein the power source is positionable on an offshore platform for coupling to the hollow core electric motor with a single electrical conductor or a twisted-pair electrical conductor to provide the electric power to the hollow core electric motor.

Example 4 is the system of examples 1-3, further comprising a controller for coupling to the hollow core electric motor with a control line to send control signals to the hollow core electric motor to move the ball valve between the open position and the closed position.

Example 5 is the system of examples 1-4, wherein the power source comprises a battery positioned proximate to the ball valve.

Example 6 is the system of examples 1-5, further comprising a controller to transmit control signals to the hollow core electric motor using a wireless telemetry system.

Example 7 is the system of examples 1-6, further comprising an auxiliary power source positionable proximate to the ball valve to provide the electric power to the hollow core electric motor to move the ball valve to the closed position in response to the power source losing electric power or in response to a loss of control signals from a wireless telemetry system.

Example 8 is the system of examples 1-7, further comprising at least one set of gears positionable to interact with the hollow core electric motor to move the ball valve between the open position and the closed position.

Example 9 is the system of examples 1-8, further comprising: a hydraulic pump to interact with the hollow core electric motor to energize hydraulic fluid of the hydraulic pump; and a hydraulic rotary actuator positionable to interact with the hydraulic fluid of the hydraulic pump to move the ball valve between the open position and the closed position.

Example 10 is an assembly comprising: a ball valve comprising a through-bore, the ball valve being movable between (i) an open position where a fluid is able to flow through the through-bore and (ii) a closed position where the fluid is prevented from flowing through the through-bore; an electric motor positionable adjacent to the ball valve to move the ball valve between the open position and the closed position by actuating a rotatable member coupled to the ball valve; and a power source positionable to provide power to the electric motor.

Example 11 is the assembly of example 10, wherein the electric motor comprises a hollow core electric motor.

Example 12 is the assembly of examples 10-11, wherein the rotatable member comprises at least one grouping of planetary gears.

Example 13 is the assembly of examples 10-12, wherein the rotatable member comprises at least one hydraulic pump and at least one hydraulic rotary actuator.

Example 14 is the assembly of examples 10-13, wherein the electric motor comprises at least two electric motors for actuating at least two hydraulic pumps, wherein the rotatable member comprises at least one hydraulic rotary actuator.

Example 15 is a method comprising: receiving an actuation signal; providing an actuation force to a ball valve using an electric motor; and moving the ball valve between an open position and a closed position using the actuation force, wherein in the open position, a fluid is able to flow through a through-bore of the ball valve, and in the closed position, the fluid is prevented from flowing through the through-bore.

Example 16 is the method of example 15, wherein receiving the actuation signal comprising receiving the actuation signal from a power source, the power source comprising at least one of a generator positioned above a surface of a wellbore or a battery positioned proximate to the ball valve.

Example 17 is the method of examples 15-16, wherein the electric motor comprises at least one hollow core electric motor.

Example 18 is the method of examples 15-17, further comprising providing a position signal from a position indicator to a controller.

Example 19 is the method of examples 15-18, further comprising cutting at least one of a slickline, a wireline, or a coil tubing extending through the through-bore of the ball valve as the ball valve moves from the open position to the closed position.

Example 20 is the method of examples 15-19, wherein moving the ball valve between the open position and the closed position using the actuation force further comprises applying the actuation force to at least one grouping of planetary gears coupled with the ball valve.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A well system comprising:
a wellhead positionable at a surface of a wellbore;
a ball valve for coupling to the wellhead, the ball valve being movable between an open position and a closed position;
a hollow core electric motor positionable adjacent to the ball valve to move the ball valve between the open position and the closed position;
a power source operable to provide electric power to the hollow core electric motor;

a hydraulic pump to interact with the hollow core electric motor to energize hydraulic fluid of the hydraulic pump; and a hydraulic rotary actuator positionable to interact with the hydraulic fluid of the hydraulic pump to move the ball valve between the open position and the closed position.

2. The system of claim 1, wherein the hollow core electric motor comprises an upper hollow core electric motor positionable adjacent to an uphole portion of the ball valve and a lower hollow core electric motor positionable adjacent a downhole portion of the ball valve.

3. The system of claim 1, wherein the power source is positionable on an offshore platform for coupling to the hollow core electric motor with a single electrical conductor or a twisted-pair electrical conductor to provide the electric power to the hollow core electric motor.

4. The system of claim 1, further comprising a controller for coupling to the hollow core electric motor with a control line to send control signals to the hollow core electric motor to move the ball valve between the open position and the closed position.

5. The system of claim 1, wherein the power source comprises a battery positioned proximate to the ball valve.

6. The system of claim 1, further comprising a controller to transmit control signals to the hollow core electric motor using a wireless telemetry system.

7. The system of claim 1, further comprising an auxiliary power source positionable proximate to the ball valve to provide the electric power to the hollow core electric motor to move the ball valve to the closed position in response to the power source losing electric power or in response to a loss of control signals from a wireless telemetry system.

8. The system of claim 1, further comprising at least one set of gears positionable to interact with the hollow core electric motor to move the ball valve between the open position and the closed position.

9. An assembly comprising:
a ball valve comprising a through-bore, the ball valve being movable between (i) an open position where a fluid is able to flow through the through-bore and (ii) a closed position where the fluid is prevented from flowing through the through-bore;
an electric motor positionable adjacent to the ball valve to move the ball valve between the open position and the closed position by actuating a rotatable member coupled to the ball valve, wherein the rotatable member comprises at least one hydraulic pump and at least one hydraulic rotary actuator; and
a power source positionable to provide power to the electric motor.

10. The assembly of claim 9, wherein the electric motor comprises a hollow core electric motor.

11. The assembly of claim 9, wherein the rotatable member comprises at least one grouping of planetary gears.

12. The assembly of claim 9, wherein the electric motor comprises at least two electric motors for actuating at least two hydraulic pumps, wherein the rotatable member comprises at least one hydraulic rotary actuator.

13. A method comprising:
receiving an actuation signal;
providing an actuation force to a ball valve using an electric motor positioned adjacent to the ball valve; and
moving, by a rotatable member coupled to the ball valve and actuated by the electric motor, the ball valve between an open position and a closed position using the actuation force, wherein in the open position, a fluid is able to flow through a through-bore of the ball valve, and in the closed position, the fluid is prevented from flowing through the through-bore, wherein the rotatable member includes at least one hydraulic pump and at least one hydraulic rotary actuator.

14. The method of claim 13, wherein receiving the actuation signal comprising receiving the actuation signal from a power source, the power source comprising at least one of a generator positioned above a surface of a wellbore or a battery positioned proximate to the ball valve.

15. The method of claim 13, wherein the electric motor comprises at least one hollow core electric motor.

16. The method of claim 13, further comprising providing a position signal from a position indicator to a controller.

17. The method of claim 13, further comprising cutting at least one of a slickline, a wireline, or a coil tubing extending through the through-bore of the ball valve as the ball valve moves from the open position to the closed position.

18. The method of claim 13, wherein moving the ball valve between the open position and the closed position using the actuation force further comprises applying the actuation force to at least one grouping of planetary gears coupled with the ball valve.

* * * * *